(12) United States Patent
Parry

(10) Patent No.: US 6,886,114 B2
(45) Date of Patent: Apr. 26, 2005

(54) MULTIPLE DEVICE ERROR MANAGEMENT

(75) Inventor: Travis J. Parry, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 577 days.

(21) Appl. No.: 10/037,833

(22) Filed: Jan. 3, 2002

(65) Prior Publication Data

US 2003/0126585 A1 Jul. 3, 2003

(51) Int. Cl.[7] .................................................. G06F 11/00
(52) U.S. Cl. ......................................... 714/48; 714/18
(58) Field of Search ............................... 714/18, 25, 27, 714/39, 43, 47, 48, 49, 57

(56) References Cited

U.S. PATENT DOCUMENTS

| | | | | |
|---|---|---|---|---|
| 5,157,667 A | * | 10/1992 | Carusone et al. .............. 714/45 |
| 5,390,326 A | * | 2/1995 | Shah ........................... 370/222 |
| 5,504,863 A | * | 4/1996 | Yoshida ........................ 714/47 |
| 5,826,003 A | * | 10/1998 | Matoba et al. .................. 714/7 |
| 6,515,967 B1 | * | 2/2003 | Wei et al. .................... 370/244 |
| 6,701,449 B1 | * | 3/2004 | Davis et al. ................... 714/4 |
| 2001/0011358 A1 | * | 8/2001 | Ochiai ......................... 714/45 |
| 2003/0126516 A1 | * | 7/2003 | Komarla et al. .............. 714/45 |

* cited by examiner

Primary Examiner—Nadeem Iqbal

(57) ABSTRACT

Methods and systems of error archiving for multiple devices have been detailed. The method includes when an error occurs at a first device of the plurality of devices, compiling error information about the error into a first error file and transmitting the first error file to a second device of the plurality of devices. When an error occurs at the second device, compiling error information about the error into a second error file. The method further includes compiling the first and second error files into a master error file. In addition, a system is described, the system includes at least two imaging devices in communication with each other. One of the at least two imaging devices is a master device. The master device is adapted to collect and store information from the at least two imaging devices and to detect class errors based on the collected error information.

20 Claims, 2 Drawing Sheets

MULTIPLE DEVICE ERROR MANAGEMENT

TECHNICAL FIELD

The present invention relates generally to the field of electronic devices and, in particular, to the collection of error information.

BACKGROUND

A wide variety of devices including office equipment, home-based equipment, and lab equipment, as well as a variety of other types of devices commonly encounter errors. Office equipment includes but is not limited to printers, scanners, facsimile machines, copiers, and various types of communication and telephony devices. Home-based devices include, for example, home entertainment equipment such as televisions, video, and audio players and recorders, receivers, as well as security systems, automobiles, appliances, thermostats, exercise equipment, medical equipment, saunas, pools, and hot tubs. Lab equipment includes, for example, measurement devices such as oscilloscopes and spectrum analyzers, testing equipment, and network devices. Within the work environment often multiple devices of the same type are employed. The users of the multiple devices often desire management of these multiple devices.

With the introduction of digital circuitry, often a LED or LCD associated with a device displays an error message when an error is detected. Currently error messages contain minimal information such as "error" and in some instances a number or code associated with the error is provided. The events leading up to and the reason for the error are frequently unknown. Often, when a service technician is contacted, the only information available to the technician is that an error occurred, possibly an error number, and a description of what led up to the error by the user or in some cases another person who is asked to relay what occurred. Without additional information, the service technician is not able to diagnose the reason for the error. In many instances, without additional information the device is simply shut down or reinitiated without solving the error causing or leading to the error(s). Significant time and money can be spent on unknown service errors for example, through the loss of information, in some instances the retransmission of information, the loss of product, personnel time spent correcting the error, resetting the device, and determining what the effect of the error was. This is particularly true in workplaces employing multiple devices.

For a system administrator the management of error detection, error correction, and error diagnosis in a multiple device environment is difficult. In particular, determining what devices are having errors, how to correct those errors short term and long term, what led up to the errors, the identification of class errors, how to prevent the repetition of errors across the multiple devices, and the like. One environment that is particularly difficult to manage is a system of multiple imaging devices such as printers, copiers, facsimile machines, scanners, plotters, digital projectors, terminals and the like. With such little information about the errors, system administrators are not able to solve these shortcomings. Currently class errors in a system of multiple devices are virtually undetected.

For the reasons stated above, and for other reasons stated below which will become apparent to those skilled in the art upon reading and understanding the present specification, there is a need in the art for improvements in the collection and management of error information for multiple devices in a system.

SUMMARY

The above-mentioned problems with the collection and management of error information for multiple devices in a system and other problems are addressed by embodiments of the present invention and will be understood by reading and studying the following specification.

A method of error archiving in a system having a plurality of devices is provided. The method includes when an error occurs at a first device of the plurality of devices, compiling error information about the error into a first error file and transmitting the first error file to a second device of the plurality of devices. When an error occurs at the second device, compiling error information about the error into a second error file. The method further includes compiling the first and second error files into a master error file.

A system is provided. The system includes at least two imaging devices in communication with each other. One of the at least two imaging devices is a master device. The master device is adapted to collect and store error information from the at least two imaging devices and to detect class errors based on the collected error information.

A computer-usable medium having computer readable instructions stored thereon for execution by a processor to perform a method is provided. The method includes communicating between a plurality of devices, compiling error information from at least two of the plurality of devices into a master error file, and determining if a class error exists amongst two or more of the plurality of devices based on the error information.

The invention further includes other methods and apparatus of varying scope.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention.

Embodiments of the present invention provide error archiving for multiple devices. The multiple devices include a wide variety of devices such as office equipment, home-based equipment, and lab equipment, as well as a variety of other types of devices. In one embodiment, error archiving includes error notification and recordation. In another embodiment, error archiving includes error notification, recordation, and diagnosis. The archiving of error information for multiple devices in a system enables a user, system administrator, service technician, or the like to "step back in time" and view what led up to the errors, determine the types and number of errors occurring in the system, propose solutions, detect class errors, and the like. Class errors include one or more of a user determined number of errors experienced by one or more of multiple devices in a system, a user determined number of a particular error experienced by one or more of multiple devices in a system, the occurrence of a defined number of errors within a defined time frame, or the like.

Various embodiments of the present invention gather device error information associated with multiple devices. This allows display and analysis of error information for multiple devices by type, location, frequency, association to other factors such as the operation being performed when the error occurred, number of errors, number of errors of each type, detection and categorization of class errors, and the like. In one embodiment, one or more of the multiple devices performs error archiving for the multiple devices. In one embodiment, one of the multiple devices is a master device and includes a software program running on some platform or operating system to manage recordation and diagnosis of errors for the multiple devices. In another embodiment, the functionality of the master device includes firmware or even hard-coded information in a device such as an application-specific integrated circuit (ASIC) chip to manage recordation and diagnosis for the multiple devices. In one embodiment, the management capability of the master device includes a set of computer-readable instructions stored on a computer-usable medium for execution by a processor. Examples of computer-usable medium include removable and non-removable magnetic media, optical media, dynamic random-access memory (DRAM), static random-access memory (SRAM), read-only memory (ROM) and electrically-erasable and programmable read-only memory (EEPROM or Flash).

Figure 1:
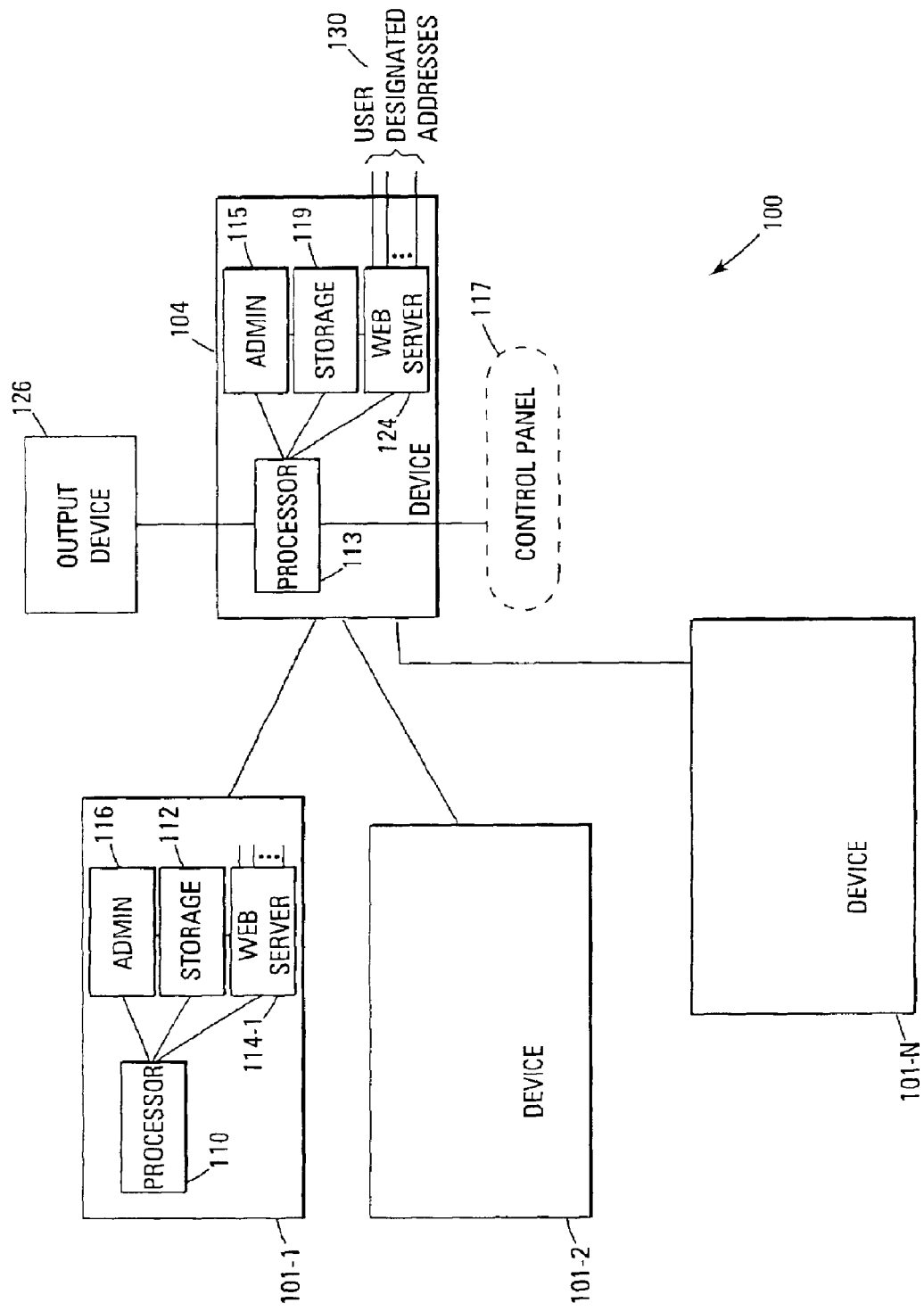
FIG. 1 is a block diagram of an embodiment of a system adapted to perform error archiving for multiple devices according to the teachings of the present invention.

FIG. 1 is a block diagram of an embodiment of a system, indicated generally at 100, adapted to perform error archiving for multiple devices according to the teachings of the present invention. System 100 includes a plurality of devices 101-1 to 101-N and 104. In one embodiment, devices 101-1 to 101-N each include a processor 110. In another embodiment, one or more of devices 101-1 to 101-N each include a processor 110 and a storage device 112 as shown in device 101-1. In one embodiment, storage device 112 is integral to processor 110 and in another embodiment, storage device 112 is external to processor 110. Storage device 112 comprises a computer-usable media such as a static random access memory (SRAM), dynamic random access memory (DRAM), a non-volatile memory device, a register, magnetic media, optical media, or the like.

In one embodiment, one or more of devices 101-1 to 101-N further include an embedded web server 114, as shown in device 101-1, for communication between devices 101-1 to 101-N and user designated addresses. In another embodiment, one or more of devices 101-1 to 101-N include an administrative program 116, as shown in device 101-1, for device management.

Device 104 is adapted to perform error archiving for multiple devices 101-1 to 101-N according to the teachings of the present invention. Device 104 includes a processor 113 and a storage device 119 coupled to processor 113 and operates as a master device that manages the recordation of errors. In one embodiment, device 104 further includes an embedded web server 124 for communication between device 104 and user-designated addresses 130. In another embodiment, device 104 further includes an administrative program 115 for device management. In another embodiment, the master device further manages the diagnosis of errors.

In operation, when devices 101-1 to 101-N experience errors, information is compiled about each error. In one embodiment, processor 110 monitors system operations of device 101-1 for an indication that an error has occurred. In another embodiment, processor 110 receives an indication when an error has occurred within devices 101-1 to 101-N such as a notification, an error signal, or the like.

Errors include service errors, system operation errors, lack of memory, cancellation of one or more operations, and the like. When an error is detected within one of devices 101-1 to 101-N or 104, a respective processor 110 or 113 compiles information about the error into an error file. Information about the detected errors include one or more of the location where the error occurred (e.g. program address where the error occurred), the type of error detected, contents of the file or operation being processed when the error occurred, sequence of events that led up to the error, type of file or operation being processed when the error occurred, size of the file or operation being processed when the error occurred, a stack trace, and the like. A user or administrator determines which error information is gathered.

In one embodiment, the error information compiled at each device 101-1 to 101-N is stored in storage devices such as storage device 112 of device 101-1 for subsequent transmission, retrieval, disposal, or the like. Storage device 112 comprises a computer-usable media such as a static random access memory (SRAM), dynamic random access memory (DRAM), a non-volatile memory device, a register, magnetic media, optical media, or the like.

In one embodiment, the error information for each device 101-1 is available for access via a web server such as web server 114 of device 101-1. In another embodiment, the error information is transmitted via web server 114 to one or more user-designated addresses such as device 104, a system administrator, an alternate storage location, or the like. In one embodiment, the user-designated addresses are web addresses, email address, http addresses, or the like. In another embodiment, the error information is provided to an administrative program such as administrative program 116 of device 101-1 for further manipulation, storage, reporting, or the like. An example of an administrative program is disclosed in U.S. Pat. No. 5,956,487 issued to Hewlett-Packard Company on Sep. 21, 1999, and entitled "Embedding Web Access Mechanism in an Appliance for User Interface Functions Including a Web Server and Web Browser."

In one embodiment, one or more of devices 101-1 to 101-N transmit compiled error files individually to device 104. In another embodiment, one or more of devices 101-1 to 101-N transmit multiple error files to device 104. The number of multiple files compiled before transmission to device 104 is defined by the size of the storage device 112 and/or user requirements. In one embodiment, device 104 polls devices 101-1 to 101-N for error files. In one embodiment, once storage device 112 is full, a notification message is transmitted to one or more of the user-designated addresses. In another embodiment, as storage device 112 becomes full, new error information is stored and old error information is deleted. In an alternate embodiment, a user determined number or type of error information is stored. In one embodiment, once the error information is transmitted to the user-designated addresses, the error information is deleted.

In one embodiment, device 104 is substantially similar to devices 101-1 to 101-N and operates as a master device that performs error archiving for all devices 101-1 to 101-N including device 104. In one embodiment, device 104 includes a control panel 117 that is internal or external to device 104. In one embodiment, control panel 117 includes a display. In one embodiment, error information is accessed via control panel 117. In another embodiment, error information is accessed via web server 124.

In one embodiment, device 104 acts as a master device and is adapted to compile error files of devices 101-1 to 101-N and 104 into a master error file. Once the error files are compiled into a master file, the master file is available for storage, transmission, retrieval, disposal or the like. In one embodiment, the error information is stored in storage device 119 for subsequent transmission, retrieval, disposal, or the like. Storage device 119 comprises a computer-usable media such as a static random access memory (SRAM), dynamic random access memory (DRAM), a non-volatile memory device, a register, magnetic media, optical media, or the like.

In one embodiment, once storage device 119 is full, a notification message is transmitted to one or more of the user-designated addresses. In another embodiment, as the storage device becomes full, new error information is stored and old error information is deleted. In an alternate embodiment, a user determined number and type of error information is stored. In one embodiment, once the error information is transmitted to the user-designated addresses, the error information is deleted.

In one embodiment, the error information is available for access via web server 124. In another embodiment, the error information is transmitted via web server 124 to one or more user-designated addresses such as the device manufacturer, the service contract administrator, a system administrator, an alternate storage location, or the like. In one embodiment, the user-designated addresses are web addresses, email address, http addresses, or the like. In one embodiment, processor 113 communicates with the user-designated addresses via web server 124. In another embodiment, the error information compiled by processor 113 is posted to one or more user-designated addresses for example the manufacturer web site. In an alternate embodiment, processor 113 makes error information available for access (e.g., a user or administrator may opt to not allow contents of a file being processed when the error occurred to be accessed.) In another embodiment, the error information is provided to administrative program 115 for further manipulation, storage, reporting, or the like. An example of an administrative program is disclosed in U.S. Pat. No. 5,956,487, entitled "Embedding Web Access Mechanism in an Appliance for User Interface Functions Including a Web Server and Web Browser." In one embodiment, processor 113 transmits the error information to an output device 126 for display, storage, printing, further manipulation, or the like. In one embodiment, output device 126 includes an imaging device, display, storage device, an administrative program, or the like. In another embodiment, the error information is stored in storage device 119 for later retrieval or transmission.

In one embodiment, devices 101-1 to 101-N are imaging devices and the error information contains information such as, the page number of the error, the type of error, the type of file or document being processed when the error occurred (e.g., a Post Script file, a text file, an image file or the like), error codes, and stack trace. In one embodiment, error archiving allows a user/service technician to access information about recent errors on multiple imaging device platforms. The error information enables a user/service technician to easily identify what is causing the errors, determine if class errors exist and what they are, report class errors based on a user/system administrator criteria, provide instructions based on detected errors and/or detected class errors, and the like. In one embodiment, error archiving allows diagnosis of a particular imaging environment, such as printing, scanning, faxing, copying, plotting, projecting and the like.

Figure 2:
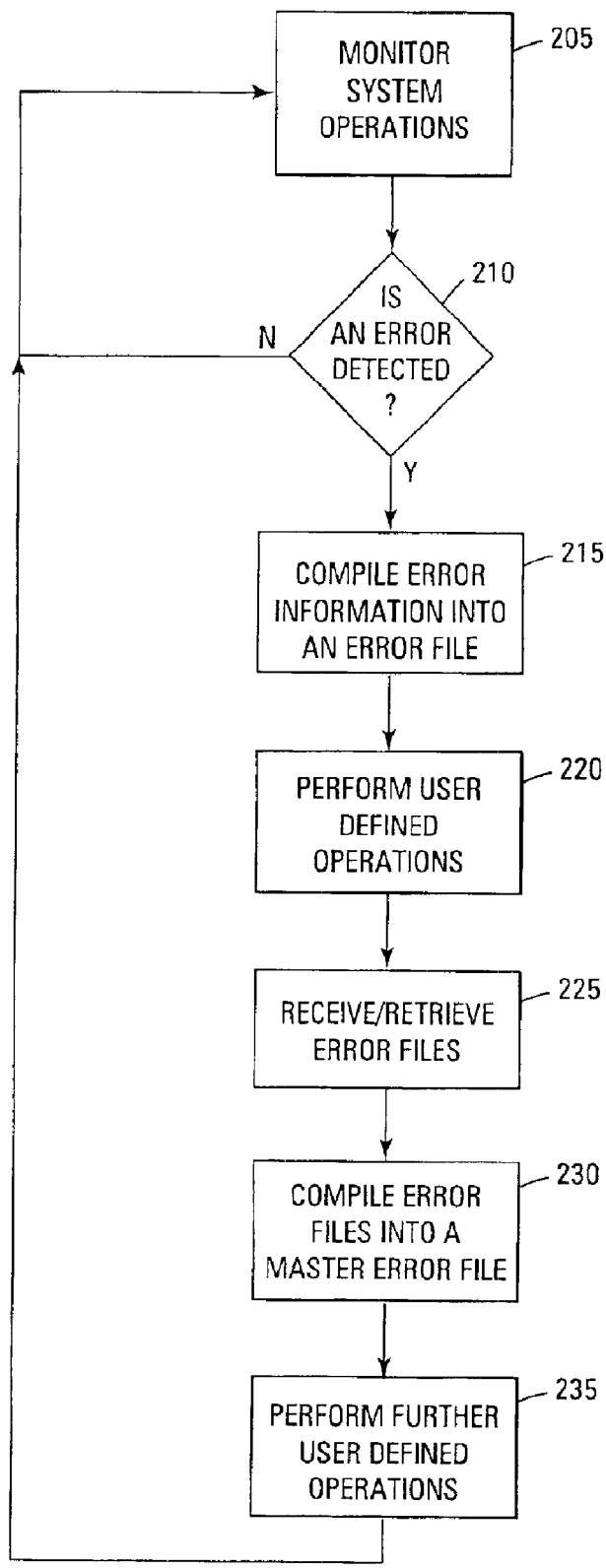
FIG. 2 is flow chart of a method of error archiving for multiple devices according to one embodiment of this invention.

FIG. 2 is a flowchart of a method of error archiving for multiple devices according to one embodiment of this invention. In one embodiment, the multiple devices are imaging devices. The method begins at block 205 where each device in a system monitors their individual system operations. The method proceeds to block 210 and each device determines if an error is detected. When an error is not detected, the method returns to block 205 and each device continues to monitor their system operations. When an error is detected at any one device, the method proceeds to block 215 and the device compiles information about the error into an error file. The method proceeds to block 220 and performs one or more user-defined operations. In one embodiment, user-defined operations for each device include one or more of storing the error file in a storage device, transmitting the error information to one or more user designated addresses, providing the error information for retrieval by an external device, transmitting the error information to an output device, disposing of the error information, determining correction procedures based on the error information, and the like. In one embodiment, transmitting error information to one or more user-designated addresses includes transmitting error detection notification to one or more user-designated addresses and providing the error information for retrieval by an external device. The method of blocks 205, 210, 215, and 220 may operate concurrently for all devices. Each device may be performing the same operation or different operations at the same time.

The method proceeds to block 225 and one of the multiple devices, a master device, or the like, receives or retrieves the error files compiled by each device. In one embodiment, the error files are received or retrieved individually. In another embodiment, the error files are received or retrieved in user-defined quantities. In one embodiment, the master device polls the other devices in the system for any error files. The number of error files received or retrieved is dependent upon the amount of storage at each device and user criteria (e.g., after a specified time, when a certain number of a type of errors are obtained, when notification from a system administrator is received, or the like). The method then proceeds to block 230 where the error files are compiled in a master error file. The method proceeds to block 235 and performs one or more further user-defined operations. In one embodiment, user-defined operations include one or more of storing the master error file in a storage device, detecting class errors, preparing an error report based on the collected error information, transmitting the error information and/or error report(s) to one or more user designated addresses, providing the error information for retrieval by an external device, transmitting the error information to an output device, disposing of the error information, determining correction procedures based on the error information, and the like. The method proceeds back to block 205 and continues to monitor device operations.

In one embodiment, transmitting error information to one or more user-designated addresses includes transmitting class error detection notification to one or more user-designated addresses and providing the error information for retrieval by an external device. In one embodiment, the output device includes an imaging device, display, storage device, an administrative program, or the like.

CONCLUSION

Methods of error archiving for multiple devices and systems employing error archiving for multiple devices have been detailed. In one embodiment, a method of error archiving in a system having a plurality of devices is described. The method includes when an error occurs at a first device of the plurality of devices, compiling error information about the error into a first error file and transmitting the first error file to a second device of the plurality of devices. When an error occurs at the second device, compiling error information about the error into a second error file. The method further includes compiling the first and second error files into a master error file.

In another embodiment, a system is described. The system includes at least two imaging devices in communication with each other. One of the at least two imaging devices is a master device. The master device is adapted to collect and store error information from the at least two imaging devices and to detect class errors based on the collected error information.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is intended that this invention be limited only by the claims and the equivalents thereof.

What is claimed is:

1. A method of error archiving in a system having a plurality of devices, the method comprising:

when an error occurs at a first device of the plurality of devices, compiling error information about the error into a first error file and transmitting the first error file to a second device of the plurality of devices;

when an error occurs at the second device, compiling error information about the error into a second error file; and compiling the first and second error files into a master error file.

2. The method of claim 1, further comprising determining that a class error exists based on the compiled files of the master error file.

3. The method of claim 1, wherein transmitting the first error file to a second device comprises transmitting the first error file in response to a query by the second device.

4. The method of claim 1, wherein transmitting the first error file to a second device comprises when a predetermined number of first error files have been compiled, transmitting the first error files to the second device.

5. The method of claim 1, wherein the error information includes at least one item selected from the group consisting of the location where the error occurred, the type of error detected, and one or more of the program address where the error occurred, contents of the file being processed when the error occurred, sequence of events that led up to the error, type of file being processed when the error occurred, size of the file being processed when the error occurred, and a stack trace.

6. The method of claim 2, further comprising when a class error exists transmitting notification of the class error to one or more user designated addresses.

7. The method of claim 1, further comprising storing the master error file in non-volatile memory for one or more of transmission, retrieval, and disposal of the error information based on user criteria.

8. The method of claim 1, further comprising compiling an error report based on the master error file.

9. A system, comprising:

at least two imaging devices in communication with the each other, wherein one of the at least two imaging devices is a master device; and wherein the master device is adapted to collect and store error information from the at least two imaging devices and to detect class errors based on the collected error information.

10. The system of claim 9, wherein the error information includes at least one item selected from the group consisting of the location where the error occurred, the type of error detected, and one or more of the program address where the error occurred, contents of the file being processed when the error occurred, sequence of events that led up to the error, type of file being processed when the error occurred, size of the file being processed when the error occurred, and a stack trace.

11. The system of claim 9, wherein the master device further comprises an embedded web server.

12. The system of claim 11, wherein the embedded web server enables communication between the master device and one or more user designated addresses.

13. The system of claim 12, wherein the one or more user designated addresses comprise one or more e-mail addresses, web addresses, printer addresses, facsimile addresses, and http addresses.

14. The system of claim 9, wherein the master device is further adapted to prepare at least one error report based on the collected error information and to transmit the error report to one or more user designated address.

15. A computer-usable medium having computer readable instructions stored thereon for execution by a processor to perform a method comprising:

communicating between a plurality of devices, wherein one of the plurality of devices is a master device comprising the processor for performing the method;

compiling error information from at least two of the plurality of devices into a master error file, wherein one of the least two devices is the master device; and determining if a class error exists amongst two or more of the plurality of devices based on the error information.

16. The method of claim 15, wherein communicating between a plurality of devices in a system comprises polling the plurality of devices for the error information.

17. The method of claim 15, further comprising storing the master error file for one or more of transmission, retrieval, and disposal.

18. The method of claim 15, further comprising transmitting the error information to one or more user designated addresses.

19. The method of claim 15, wherein the one or more user designated addresses comprise one or more of e-mail address, web address, printer address, facsimile address, and http address.

20. The method of claim 15, wherein the error information includes at least one item selected from the group consisting of the location where the error occurred, the type of error detected, and one or more of the program address where the error occurred, contents of the file being processed when the error occurred, sequence of events that led up to the error, type of file being processed when the error occurred, size of the file being processed when the error occurred, and a stack trace.

* * * * *